United States Patent [19]
Thiermann

[11] 3,734,540
[45] May 22, 1973

[54] UTILITY SERVICE TRAILER

[76] Inventor: William E. Thiermann, 10726 N. Wauwatosa Road, Mequon, Wis. 53092

[22] Filed: Apr. 5, 1971

[21] Appl. No.: 131,115

[52] U.S. Cl. ................... 280/482, 280/63, 280/143, 280/490 R, 296/24 R, 242/86.5 R
[51] Int. Cl. .............................. B60d 1/00, B60d 1/16
[58] Field of Search .................... 280/482, 490 R, 63; 214/3; 242/86.5 R

[56] References Cited

UNITED STATES PATENTS

| | | | |
|---|---|---|---|
| 2,355,441 | 8/1944 | Jacob | 242/86.5 R |
| 2,620,201 | 12/1952 | Brady | 280/482 X |
| 2,876,036 | 3/1959 | Olson | 280/482 X |
| 3,073,574 | 1/1963 | Garnett | 242/86.5 R |
| 3,112,037 | 11/1963 | Thiermann | 214/3 |
| 3,379,392 | 4/1968 | Garnett | 242/86.5 R |

FOREIGN PATENTS OR APPLICATIONS

| | | | |
|---|---|---|---|
| 214,752 | 5/1941 | Switzerland | 280/490 R |

*Primary Examiner*—Leo Friaglia
*Attorney*—Andrus, Sceales, Starke & Sawall

[57] ABSTRACT

An extensible trailer tongue is telescoped beneath the floor of the trailer with a hitch on its forward end at an appropriate level for attachment to a vehicle ahead, and when extended forwardly the tongue is raised to a higher level and locked in position to clear road obstacles, with the hitch lowered relative to the tongue to again be disposed at the appropriate level for attachment to the same vehicle ahead. The tongue rides loosely between an upper and a lower track facing each other, and has upper rollers at its rear end bearing upwardly against the upper track and lower rollers disposed forwardly of said upper rollers and supporting the rear end of the tongue on the lower tracks. Means are provided to take up the looseness between the tongue and the track at hitch locations of the tongue. The body of the trailer has a platform for supporting utility poles and equipment with adjustably positioned stakes at either end and with a triangular central pillow serving as a central stake to position logs to one side of the trailer body. Side stakes or pole bolsters are secured in selected positions by lateral pins on one side thereof entering corresponding key slots in the side walls of the trailer with heads on the pins interlocking the stakes against displacement and with spring loaded lock bolts preventing raising of the pins out of their corresponding slots. The platform is reinforced longitudinally by upstanding cabinets along either side, by a longitudinal channel extending centrally beneath the platform and receiving the tongue, and by diagonal compartments on either side of the channel. Cross beams are provided at the ends and beneath the platform.

10 Claims, 20 Drawing Figures

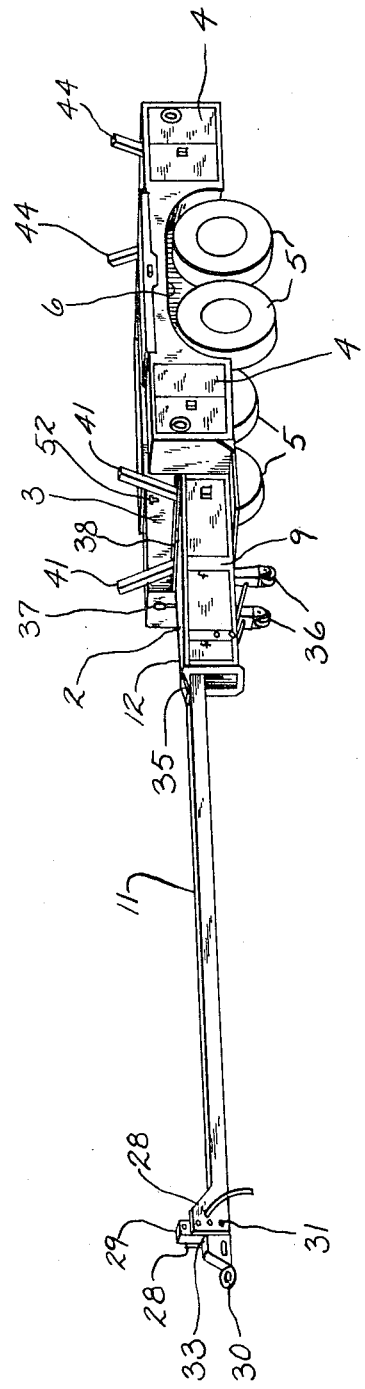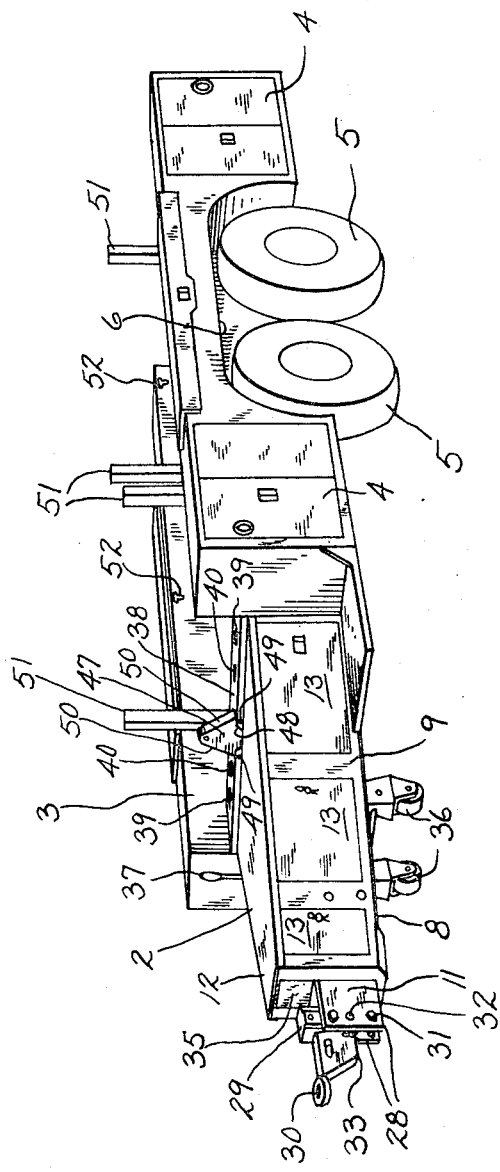
INVENTOR
WILLIAM E. THIERMANN
ATTORNEYS

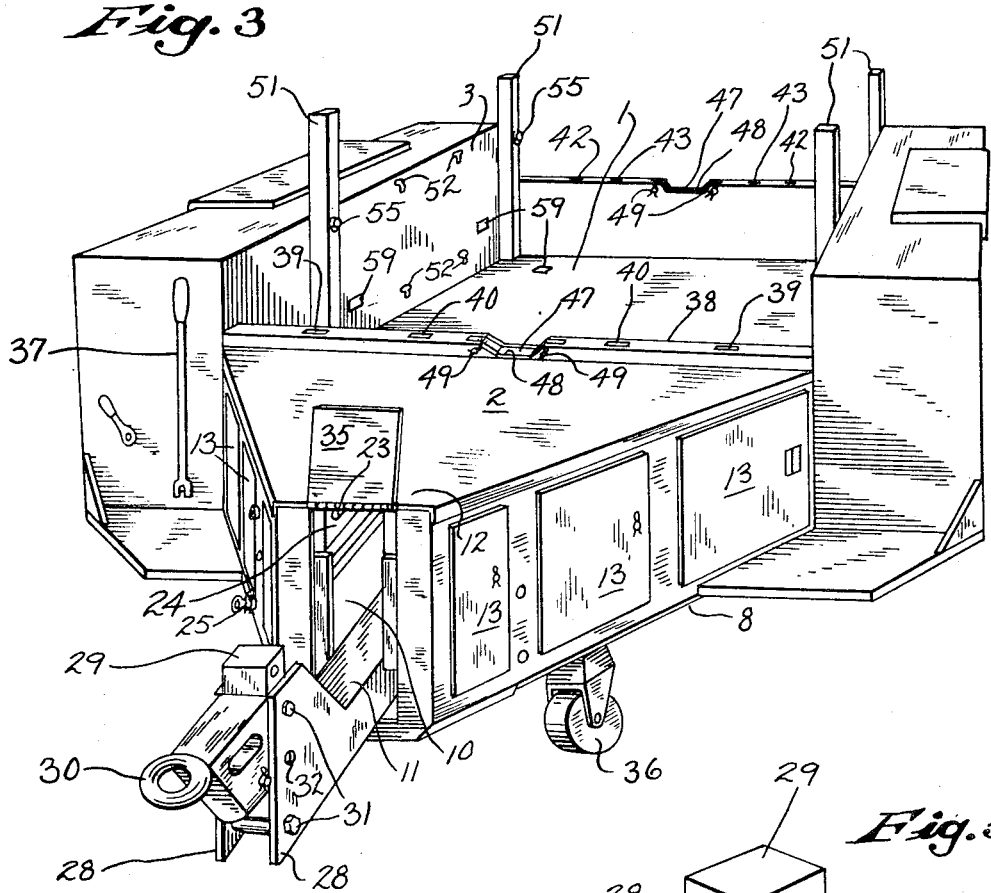
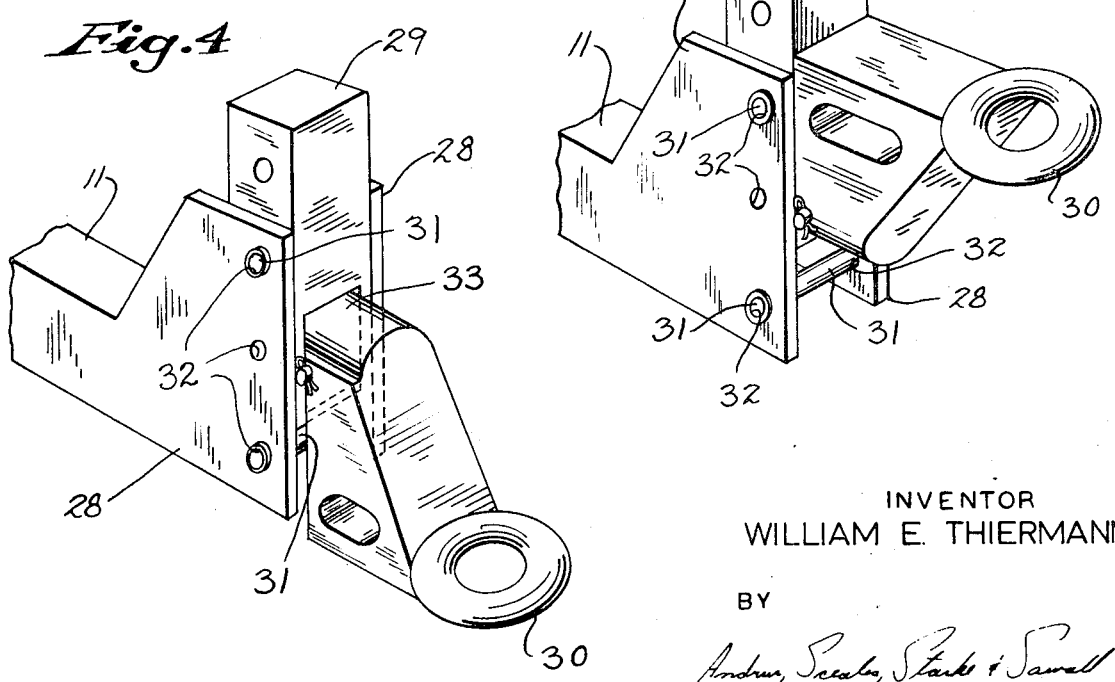

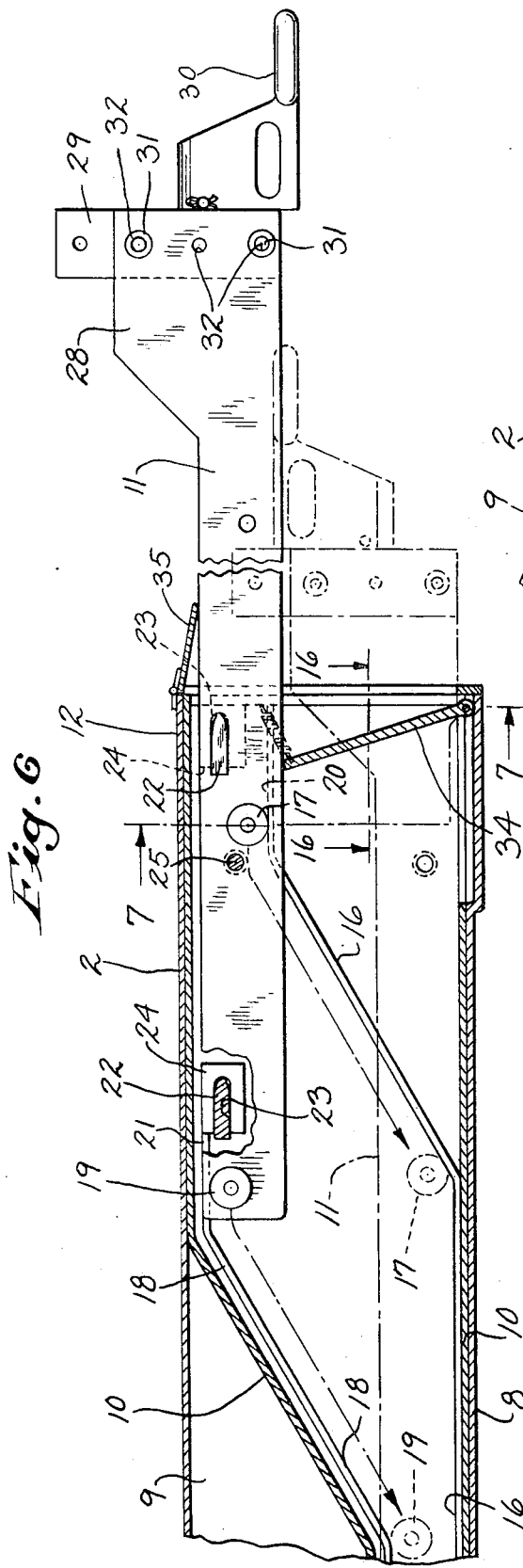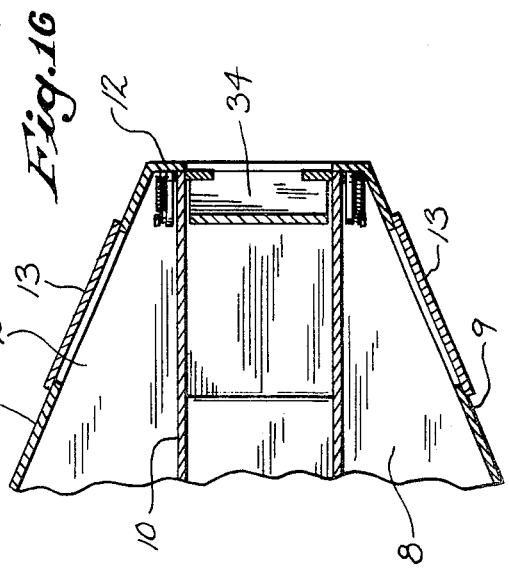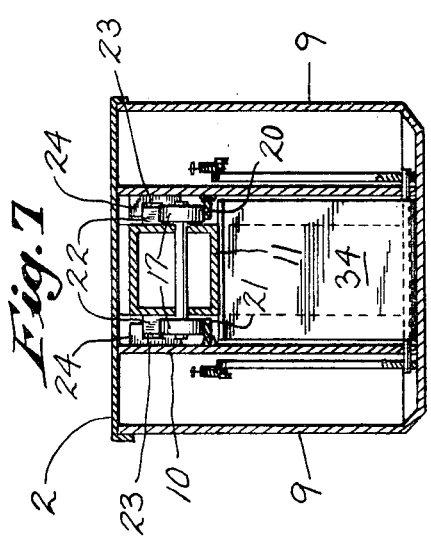

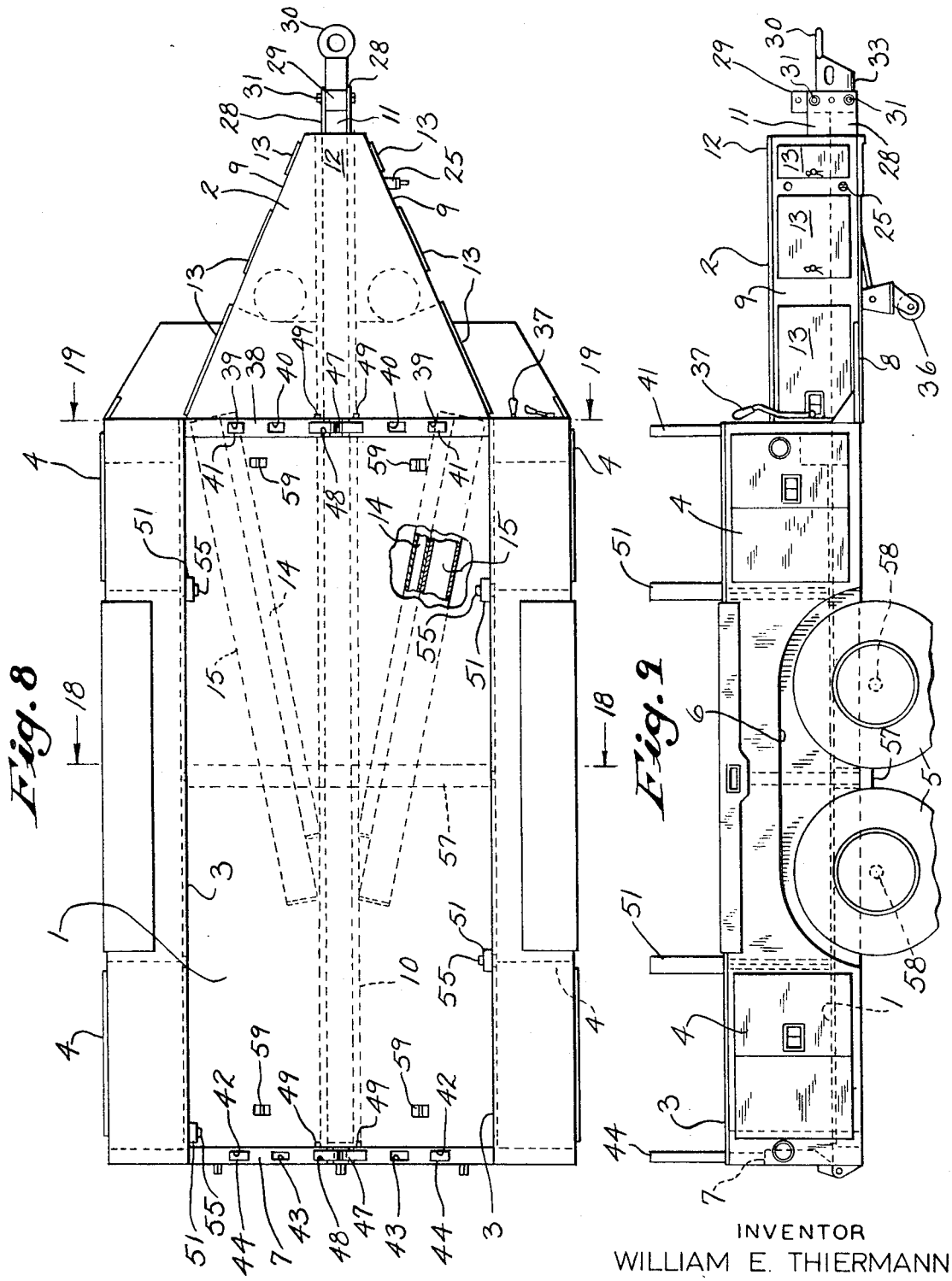

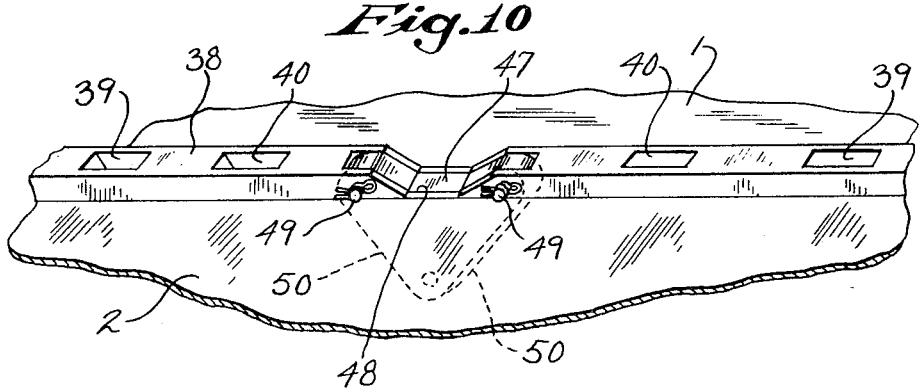
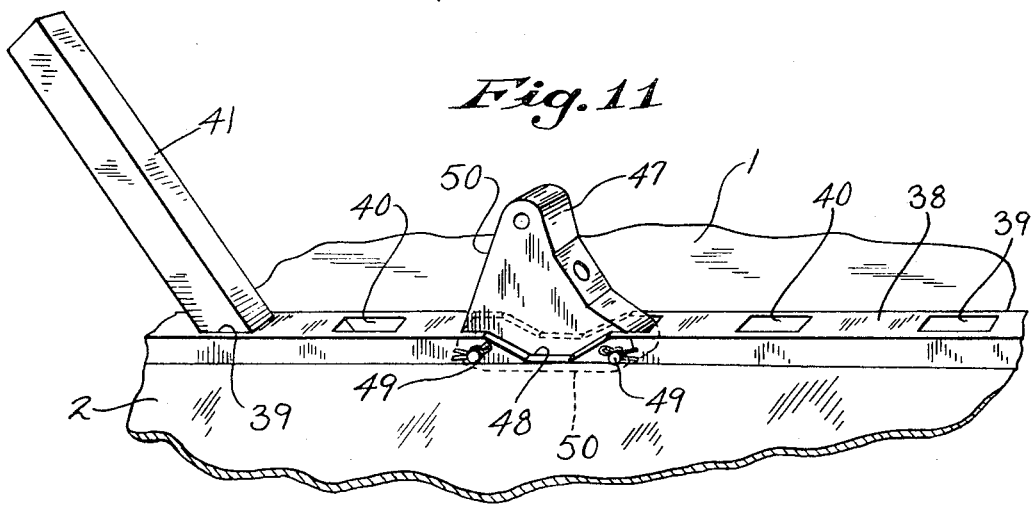
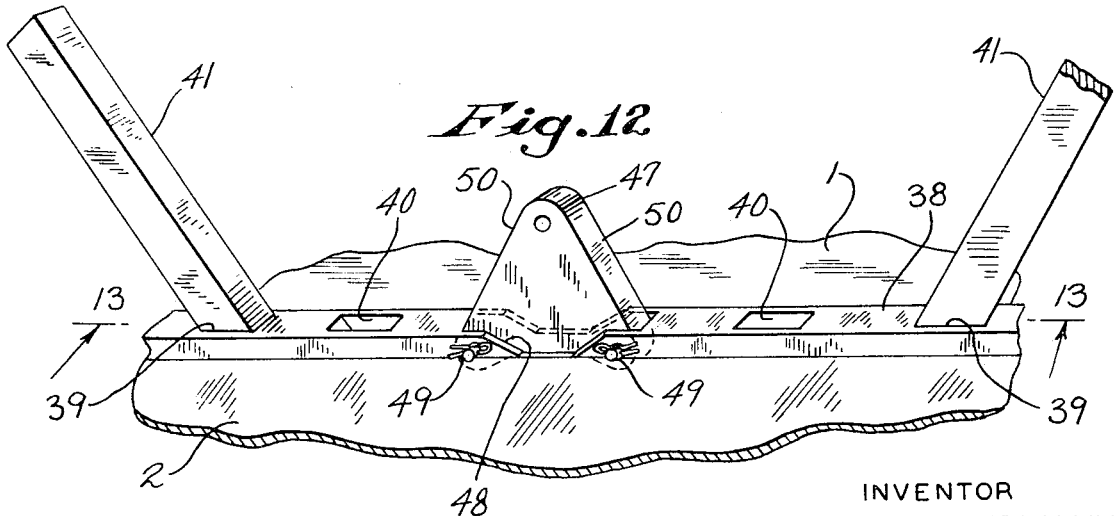

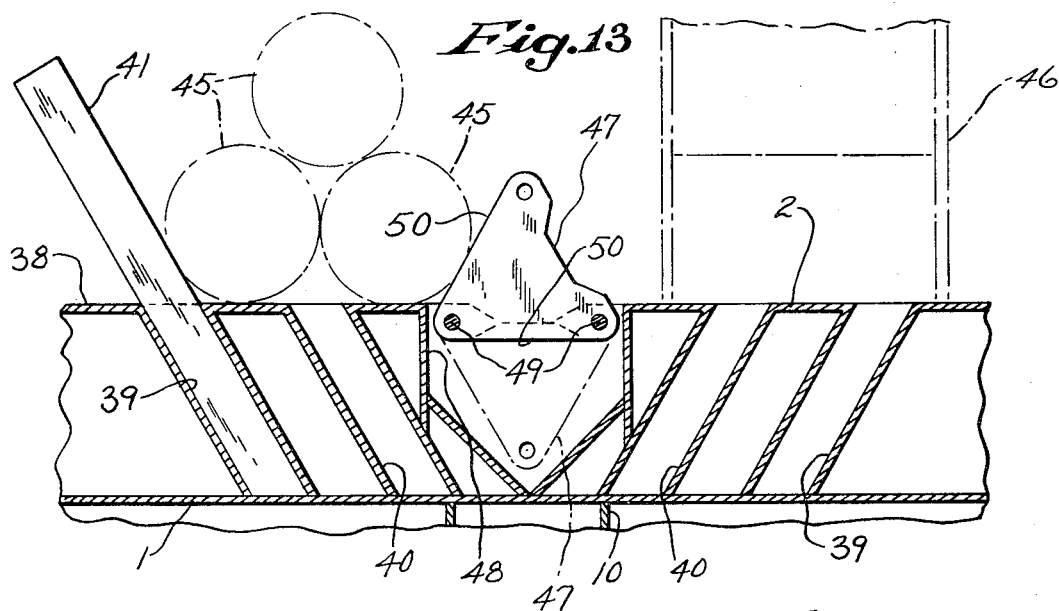
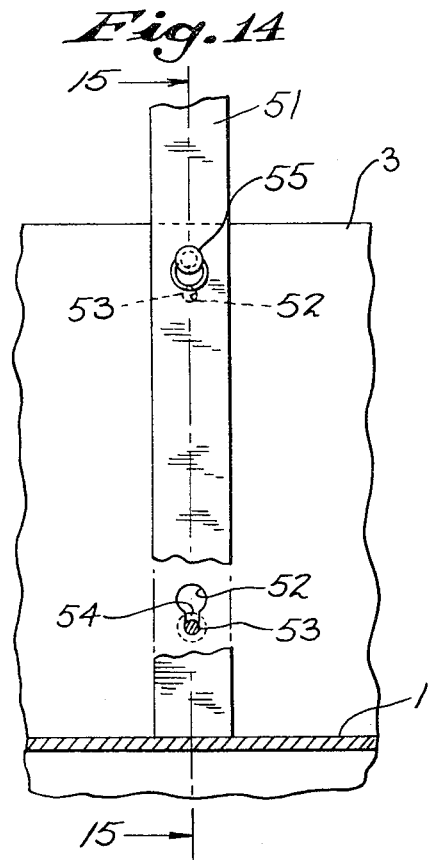
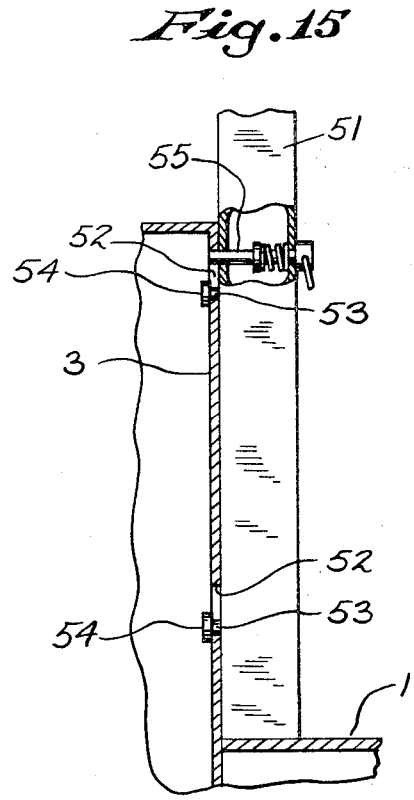

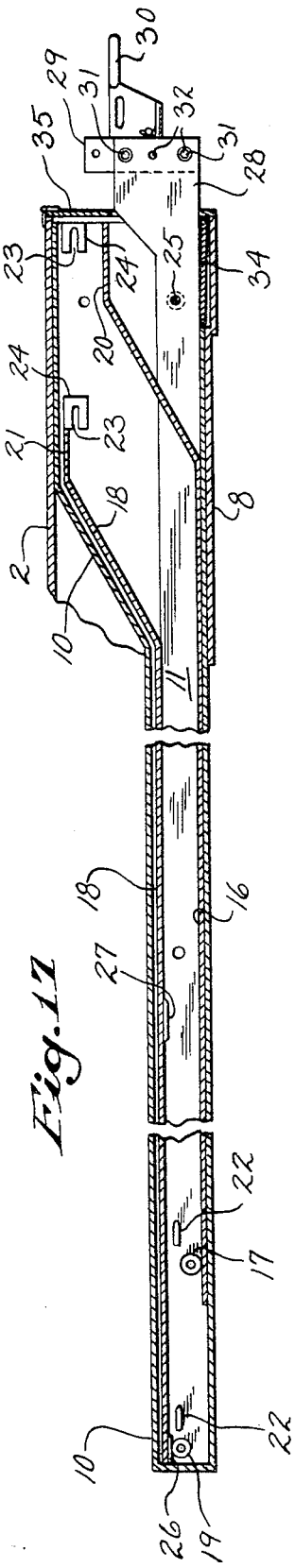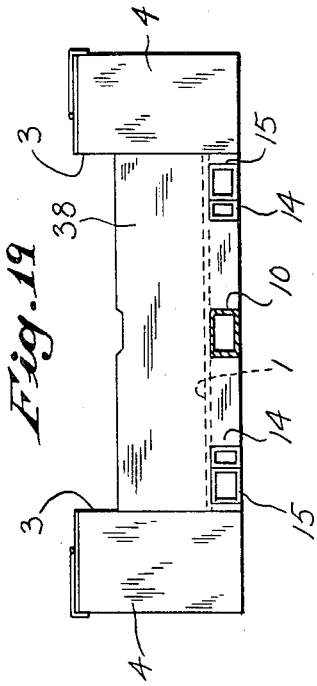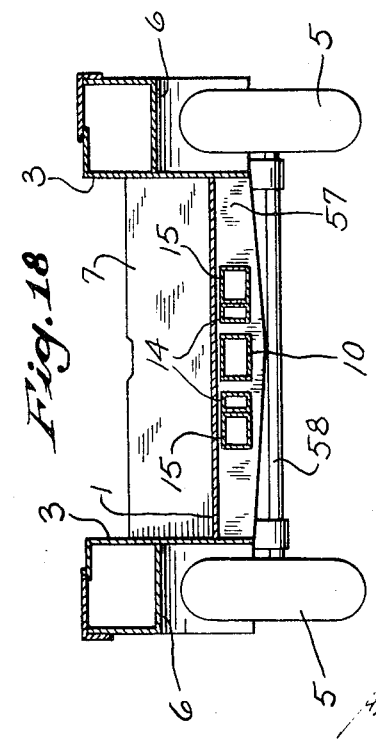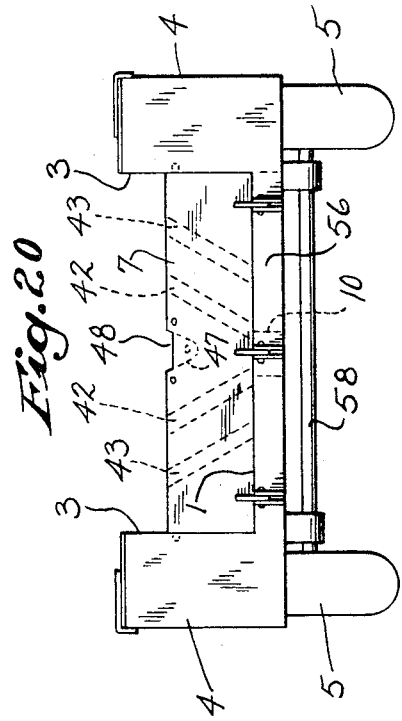

UTILITY SERVICE TRAILER

BACKGROUND OF THE INVENTION

The present invention relates to a utility service trailer for use by crews of line repairmen and the like in carting large spools of cables, pipe, utility poles, winches and various construction equipment.

Heretofore various trailers have been provided for hauling boats and logs, and boxed in trailers have been provided for hauling various items of freight. However, so far as applicant is aware, no one has provided a trailer especially designed and constructed to fill substantially all of the needs of utility line crews and the like.

These needs require the ability to haul to a work site such items as large spools of cable with equipment for unwinding the same, various lengths of poles from twenty to 40 to 60 and more feet in length, many items of hardware such as various small clamps, bolts, eyelets, spacers and brackets, suitable cross arms for the poles, and various small tools and repair equipment.

A single trailer adapted to carry an adequate one day supply of the above items for a line crew requires special construction. For instance, in order to properly balance poles of different lengths upon the trailer it is necessary to provide a tongue which is extensible to different lengths and when extended it must clear uneven roads which become a factor upon increase in the distance between the trailer wheels and the rear wheels of the vehicle pulling the trailer.

Furthermore, the trailer must have compartments capable of being locked for containing the various accessory items, must have a stable platform for carrying one or more large spools of cable with equipment for dispensing the same, and must have facilities for carrying the necessary utility poles of various lengths and cross arms therefor.

While various trailers designed for other purposes can be used for one or more of the needs above outlined, there has been no trailer heretofore designed and constructed especially for the combined needs of line crew men.

SUMMARY OF THE INVENTION

In carrying out the present invention a vehicle trailer has an extensible tongue adapted to telescope in a channel generally at the platform level of the trailer to provide a short hitch to the vehicle ahead, and adapted to extend forwardly a substantial distance and to be raised to a higher level to provide a long hitch to the vehicle ahead.

The hitch on the forward end of the tongue is adjustable in height to match the height of the draw bar on the vehicle ahead and is constructed offset vertically with respect to the tongue to provide for retaining the same height for the hitch by merely turning it over to accommodate the change in height of the tongue between the short hitch position and the long hitch position.

The tongue is secured rigidly with respect to the trailer body for both the short hitch position and the long hitch position, and is mounted on rollers riding on tracks to provide ease of telescoping and of raising and lowering the tongue intermediate the two positions.

The tongue rides loosely between an upper and a lower track facing each other, and has upper rollers at its rear end bearing upwardly against the upper track and lower rollers disposed forwardly of said upper rollers and supporting the rear end of the tongue on the lower tracks. Means are provided to take up the looseness between the tongue and the track at hitch locations of the tongue.

A continuous series of cabinets along each side of the platform strengthen the same and are adapted to carry the necessary accessories and provide bolster means for securing side stakes thereto.

The forward end of the platform is raised to provide sockets for selectively holding stakes and the rear hinged tail gate also has sockets for receiving stakes.

The vertical cabinet walls on either side of the platform have a plurality of spaced pairs of vertically aligned keyhole slots with the larger opening at the upper end of each thereof for receiving T projections on one side of a corresponding stake and securing the latter in place. A spring biased pin extends through each stake above one of the projections for dropping into the upper end of the key slot when the stake is secured thereby to prevent raising of the stake out of its interlock with the corresponding key slots.

A triangular central pillow is disposed in a transverse recess in the raised forward end of the platform and is adjustable to either lie flush with the raised platform or to provide an upstanding inclined stake facing either side of the trailer.

The platform is reinforced by the longitudinal channel extending centrally from end to end of the trailer and which receives the telescoping tongue therein, and by a pair of diagonally disposed compartments for containing pole cross arms and to which access is provided by doors beneath the raised forward portion of the platform.

BRIEF DESCRIPTION OF THE DRAWINGS

The drawings furnished herewith illustrate the best mode presently contemplated for carrying out the invention as described hereinafter.

In the drawings:

FIG. 1 is a perspective view of the trailer with the tongue extended and with the stakes disposed for receiving a full load of long poles;

FIG. 2 is a perspective view of the trailer with the tongue collapsed and with the stakes disposed vertically for a full load of short poles;

FIG. 3 is a perspective view of the trailer showing the tongue partially extended;

FIG. 4 is a detail perspective view of the forward end of the tongue showing the hitch as employed with the tongue extended;

FIG. 5 is a view similar to FIG. 4 showing the hitch as employed with the tongue collapsed;

FIG. 6 is a longitudinal vertical section showing the track and support for the tongue;

FIG. 7 is a transverse horizontal section taken generally on line 7—7 of FIG. 6;

FIG. 8 is a top plan view of the trailer;

FIG. 9 is a side elevation of the construction of FIG. 8;

FIG. 10 is a detail perspective view of the front platform with the triangular pillow in one position;

FIG. 11 is a view similar to FIG. 10 with the pillow in a second position;

FIG. 12 is a view similar to FIGS. 10 and 11 with the pillow in another position.

FIG. 13 is a transverse vertical section through the bolster portion of the front platform and showing the several sockets for selectively receiving stakes.

FIG. 14 is a detail elevation showing a pair of key slots in the vertical wall of a cabinet with a stake secured therein;

FIG. 15 is a vertical central section taken on line 15—15 of FIG. 14 and with a stake secured in place by the key slots;

FIG. 16 is a detail section showing the closure for the front opening through which the tongue telescopes;

FIG. 17 is a schematic longitudinal showing of the track system and rollers for supporting the tongue;

FIG. 18 is a transverse schematic section taken on line 18—18 of FIG. 8 showing the central cross beam;

FIG. 19 is a transverse schematic section taken on line 19—19 of FIG. 8 showing the front cross beam; and FIG. 20 is a rear end view of the trailer.

DESCRIPTION OF THE PREFERRED EMBODIMENT

Referring to the drawings, the trailer body comprises in general a generally rectangular platform 1 with a raised forward extension 2 and vertically extending side walls 3 provided by cabinets 4.

The platform 1 is suitably supported upon wheels 5 disposed in recesses 6 in the cabinet area on either side of the trailer.

A hinged tail gate 7 closes the rear end of the trailer to prevent loss of objects being carried on platform 1. The tail gate may be latched in any suitable manner and when released it swings rearwardly and downward to facilitate loading and unloading of the trailer.

The front platform extension 2 and the tail gate 7 are preferably at the same height, and the side walls 3 extend to a greater height to provide additional cabinet space and reinforcement for the platform.

The front platform extension 2 has a bottom plate 8 joined rigidly to the upper platform extension by side walls 9 which provide a strong box structure forwardly of platform 1.

A tubular channel 10 extends longitudinally of the trailer centrally thereof beneath and secured to platform 1 to provide a backbone reinforcement for the platform and to provide a housing for telescoping the tongue 11 when the latter is retracted to the short hitch position.

The raised forward extension 2 of the platform is of generally triangular shape in plan view with the apex 12 pointing forward and through which the tongue 11 extends.

The side walls 9 of extension 2 are provided with suitable doors 13 to provide access for storage of various tools and parts needed by the line crew.

Diagonal channels 14 and 15 extend rearwardly beneath and are secured to platform 1 from either side of the space between extension 2 and plate 8 to provide long compartments for receiving pole cross arms and the like through corresponding doors 13.

The channels 14 and 15 extend diagonally inward to engage channel 10 near the center of the platform 1, and serve to reinforce the platform construction.

The tongue 11 has a length corresponding generally to the full length from the apex 12 to the tail gate 7 and can be extended forwardly from the apex 12 nearly the full length thereof.

During the extension of tongue 11 and as it is being pulled forwardly through the apex 12, the channel 10 maintains the tongue at the lower level beneath platform 1 until the rear end of the tongue reaches the space beneath the platform extension 2.

The track system for supporting the tongue 11 comprises an upwardly facing track of rail 16 inside tubular channel 10 and on each side of the tongue. A roller 17 carried on each side of the tongue rides freely on the corresponding lower track 16.

A similar track or rail 18 faces downwardly inside tubular channel 10 and on each side of the tongue.

A roller 19 carried on each side of the tongue rides freely against the corresponding upper track 18.

The tracks 16 and 18 extend from the rear tail gate end of tubular channel 10 forwardly to the apex 12 of platform extension 2.

Between platform extension 2 and plate 8 the tracks 16 and 18 incline upwardly and forwardly in parallel relation to upper horizontal track portions 20 and 21, respectively adapted to receive the corresponding rollers 17 and 19 when the tongue 11 is in its upper fully extended position.

The rollers 19 are generally disposed at or near the rear end of tongue 11, and the rollers 17 are disposed substantially forward of rollers 19 a distance corresponding generally to the horizontal distance between the inclined sections of the respective tracks, so that the weight of the forward end of tongue 11 will generally tilt the tongue upon rollers 17 in a direction urging rollers 19 into engagement with tracks 18, and the rollers 17 and 19 interact with their tracks to maintain the tongue generally horizontal at all times.

Tracks 16 and 18 are preferably spaced apart vertically a little in excess of that required for the vertical spacing of rollers 17 and 19 so that one man can move the tongue 11 from a retracted to an extended position and vice versa.

As the tongue 11 reaches its uppermost level with rollers 17 riding on the horizontal track portions 20 and with rollers 19 pressing upwardly against the horizontal track portion 21 at the top of the inclined track 18, two longitudinally spaced projections 22 on each side of tongue 11 enter corresponding recesses 23 in fixed blocks 24 to interlock the tongue in place in the trailer.

The described interlock between the tongue 11 and the trailer maintains the tongue 11 parallel to platform 1 when in its raised extended position.

The tongue 11 is additionally secured to the trailer at either the extended upper or the retracted lower level position by a transverse pin 25 selectively inserted through suitable aligned openings in the side walls of apex 12 and the tongue.

When the tongue is fully retracted each roller 19 engages a wedge block 26 beneath the corresponding track 18 to compensate for the slack in vertical positioning of the tracks and generally secure the rear end of the tongue against undue play.

The tongue 11 also serves as a trailer hitch when extended half way to accommodate generally poles of forty foot length. For this purpose a central transverse hole is provide through the tongue to receive pin 25 and secure the tongue in place. Additionally a wedge block 27 may be provided beneath each of the upper tracks 18 at the position of the corresponding roller 19 when the tongue is thus in its intermediate draw position, so that the slack between tracks 16 and 18 is taken up at this position.

The tongue 11 is generally rectangular in section with the vertical side walls 28 thereof extending forwardly in spaced relation for receiving the head 29 which carries the hitch 30.

The head 29 is secured between side plates 28 by pins 31 received selectively in a series of vertically aligned holes 32 in the plates 28 to effect a general adjustment for the height of the hitch 30.

Additionally, the hitch 30 is carried upon the forward end of an offset arm 33 which can be turned over in head 29 to maintain the hitch 30 at the desired same height regardless of whether the tongue 11 is in its lower contracted position or in its upper extended position.

A spring biased door 34 closes the forward opening beneath the tongue in apex 12 when the tongue 11 is raised to its upper level. This spring loaded door also helps to raise the tongue when it is being extended.

A hinged flap 35 closes the forward opening above the tongue in apex 12 when the tongue is lowered to its lower level.

The tongue 11 is generally tubular to accommodate the necessary wiring and hydraulic brake connections from the forward towing vehicle to the trailer.

Forward tilting of the trailer when the hitch 30 is disconnected from the draw bar of the vehicle ahead, is prevented by a pair of rotatably mounted retractable rollers 36 beneath the triangular forward end of plate 8. A suitable hydraulic system operable by pump lever 37 at one side of extension 2 serves to raise and lower the auxiliary rollers 36.

The trailer is particularly adapted to carry line poles and large spools of cables with all of the necessary accessories and tools required by a line crew.

For this purpose the vertical wall 38 between platform 1 and the raised platform extension 2 has a plurality of outwardly slanting channel recesses 39 and 40 therein on either side for the selective reception of one or more stakes 41 to confine poles laterally on the trailer.

The wall 38 extends downwardly beneath platform 1 to plate 8 and has suitable notches therein for receiving the channel 10 and the diagonal compartment channels 14 and 15.

The tail gate 7 has a set of slanting recesses 42 and 43 similar to recesses 39 and 40 for selectively receiving one or more stakes 44 for the same purpose.

Where it is desired to load poles 45 on only one side of the trailer and to carry a spool 46 of cable, transformer or other material on the opposite side of the trailer a central triangular pillow 47 is employed.

Pillow 47 lies in a recess 48 in wall 38 and is secured therein selectively in any one of three positions by two pins 49 at opposite corners of the pillow.

As shown in FIGS. 10 to 12, inclusive, the pillow 47 may be flush with the top of the raised platform extension 2 or it may be raised to provide a slanting surface 50 facing either side for supporting and confining logs between the same and a side stake 41.

A similar pillow 47 may be provided in the tail gate 7 to cooperate with the pillow 47 in vertical wall 38 to confine the load of poles.

Additional stakes 51 may be selectively secured to the vertical walls 3 on either side of the trailer. For this purpose a pair of vertically spaced key-hole slots 52 are provided at suitable locations in walls 3 with the larger openings of the slots at the upper ends thereof.

Each stake 51 has a pair of longitudinally spaced projections 53 with heads 54 thereon extending from one side of the stake and adapted to be inserted through the upper enlarged end of the corresponding key-hole slot 52, after which the stake is dropped to a position where heads 54 are confined behind the smaller ends of the corresponding key-hole slot 52 to thereby interlock the stake 51 in place.

A spring pressed pin 55 extends through each stake 51 at a position where its normally projecting end enters the upper end of one of the key-hole slots 52 to prevent accidental raising of the stake and release thereof from wall 3. When it is desired to remove a stack 51, the pin 55 is pulled outwardly against its spring to disengage the pin from wall 3, after which the stake 51 may be raised until heads 54 register with the large upper opening of the corresponding slots for release therethrough.

The side walls 3 and cabinets 4 generally extend downwardly beyond platform 1 to the level of plate 8 and the bottom of channel 10.

The side edges of platform 1 and also the ends of the front bolster represented as wall 38 are welded to the corresponding walls 3.

A similar bolster construction is provided at the tail gate 7 where cross member 56 is welded to the side walls 3 and to the rear end of platform 1 and of channel 10.

A central cross member 57 disposed between the wheel axles 58 has its ends welded to the corresponding walls 3 and has openings therethrough for receiving channel 10 and channels 14 and 15, respectively.

The construction provides a strong rugged trailer which provides all of the needs for a utility line crew.

Suitable recessed brackets 59 may be provided where needed in platform 1 and side walls 3 for securing tie down straps.

Suitable attachments, not shown, may be provided on the upper ends of stakes 51 for supporting a spool of line cable for rotation in paying out the cable.

Various modes of carrying out the invention are contemplated as being within the scope of the following claims particularly pointing out and distinctly claiming the subject matter which is regarded as the invention.

I claim:

1. A utility service trailer comprising a platform generally surrounded by a low front wall and rear tail gate and substantially higher side walls, a platform extension forwardly of the upper edge of said front wall, a trailer hitch mounted on an extensible tongue and disposed at the forward end of said platform extension, wheel means disposed outwardly of said side walls and generally centrally thereof for supporting the trailer, and cabinet storage means for small tools and accessories disposed outwardly of said side walls and recessed to receive said wheels.

2. The construction of claim 1 in which said hitch carried by said tongue having a length substantially corresponding to the length of said platform and platform extension, and being extendable forwardly for substantially its full length to accommodate carrying of long poles upon the trailer.

3. The construction of claim 2 in which said tongue telescopes within a channel secured to said platform, and means in said forward platform extension to raise said tongue bodily to a higher level when extended.

4. The construction of claim 3 in which said hitch is offset vertically from its attachment to said tongue whereby reversal of said offset accommodates the change in height of said tongue and maintains the height of said hitch substantially constant.

5. The construction of claim 3 in which said last named means comprises spaced opposed inclined tracks on each side of the tongue and corresponding side rollers carried by said tongue and disposed to ride along said tracks and to maintain the tongue substantially horizontal as it moves forward in extending and rearward in contracting.

6. The construction of claim 5 in which each of said tracks have a horizontal section at the upper end of the inclined portion thereof, and means to interlock said tongue with said platform extension when fully extended.

7. A utility service trailer comprising a wheel supported body, an extensible tongue having a hitch on its forward end and adapted to accommodate a load of various length poles on said body, and track means mounting said tongue in said body, a portion of said track means being inclined to raise said tongue relative to the trailer when the tongue is fully extended and to lower said tongue when retracted.

8. The construction of claim 7 in which said track means comprises opposed downwardly facing upper rails and upwardly facing lower rails disposed on opposite sides of the tongue, a roller carried by said tongue on each side near the rear end thereof for engagement with the corresponding upper rail, and a roller carried by said tongue on each side thereof and spaced forwardly of said first named rollers for engagement with the corresponding lower rails with the bulk of the tongue extending forwardly of said last named rollers and tending to maintain the upper rollers in engagement with their corresponding rails.

9. The construction of claim 8 in which said upper and lower sets of rails are generally spaced vertically from each other in the horizontal sections thereof a distance loosely accomodating said rollers to facilitate movement of said tongue, and means to rigidly secure said tongue relative to said track means at locations for draw purposes.

10. The construction of claim 9 in which said last named means comprises in at least part a lateral pin adapted to be inserted through a part of said trailer body and selectively through an opening in said tongue.

* * * * *